Aug. 19, 1969  H. P. PETERS ET AL  3,461,610
GASKET BRACE
Filed Sept. 28, 1967
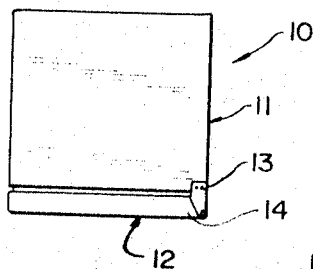
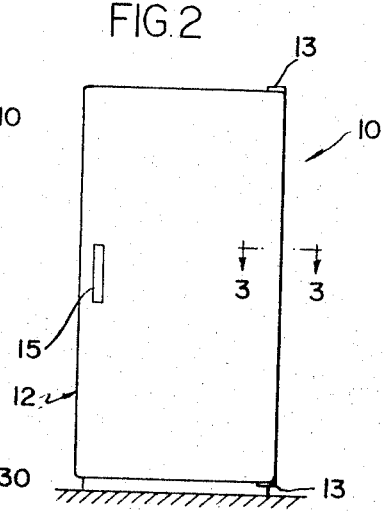
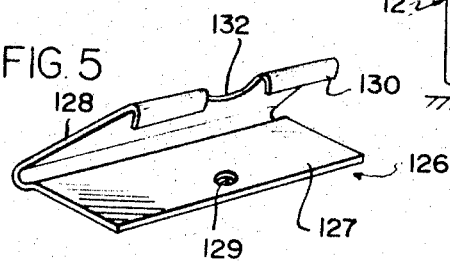
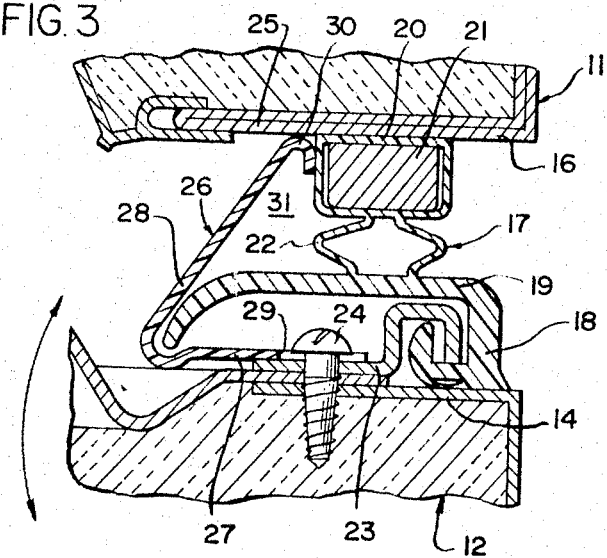
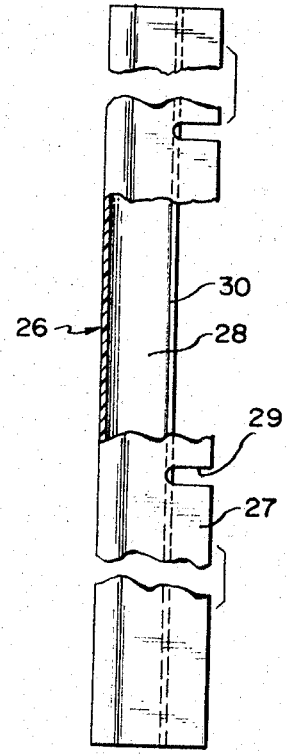
INVENTORS.
HAROLD P. PETERS
JOHN T. WOODS
BY Hofgren, Wegner, Allen, Stellman & McCord
ATTORNEYS.

3,461,610
GASKET BRACE
Harold P. Peters and John T. Woods, Evansville, Ind., assignors to Whirlpool Corporation, a corporation of Delaware
Filed Sept. 28, 1967, Ser. No. 671,296
Int. Cl. F25d 23/02
U.S. Cl. 49—478                                    12 Claims

ABSTRACT OF THE DISCLOSURE

A gasket brace for bracing a flexible magnetic gasket against roll-over during the closing of a door to insure a positive seal. The illustrated gasket is used on a refrigerator door and the brace is associated with the portion of the gasket at the hinged side of the door. The brace extends longitudinally of the gasket and bears against the inner side of the magnet holding portion of the gasket. It is adapted to be readily installed in the field and is mounted on the door by the means for mounting the magnetic gasket thereon.

---

This invention relates to door seal structures and in particular to magnetic gasket door seal structures.

In one form of door seal structure comprising a magnetic gasket structure such as shown in Bower et al. United States Letters Patent No. 2,958,912 issued Nov. 8, 1960, a magnetic gasket is secured to the door of a refrigerator cabinet to extend flexibly therefrom and sealingly engage the confronting portion of the cabinet when the door is swung to the closed position. The gasket includes internally a magnetic element which is magnetically attracted to the confronting portion of the cabinet structure thereby to provide an improved seal of the door to the cabinet frame. It has been found that at times a roll of the gasket occurs as a result of a failure of the gasket surface to slide along the door frame surface as the door is swung to the closed position. The undesirable rolling occurs most frequently adjacent the hinged edge of the door, because in the conventional modern refrigerator the pivot point of the door has a relatively long radius so that the gasket has a substantial sliding contact with the cabinet frame. Since the magnet means in the gasket provides a relatively strong retaining force, there is a tendency for the gasket to roll by the lateral flexing action caused by the continuing closing of the door after the gasket comes into sealing engagement with the cabinet frame at the beginning of this sliding action. Such rolling of the gasket causes an abnormal flexing wear of the gasket and prevents the forming of a proper final seal of the door to the cabinet frame. Thus, heat leakage may occur. Further, such abnormal wear of the gasket adversely affects the appearance thereof.

In a conventional refrigerator which is designed for a hinged mounting of the door along one edge of the cabinet frame only, a nonmagnetic plug may be utilized in the gasket along the hinged edge to alleviate the problem. However, in refrigerators having doors with reversible hinges wherein the hinged edge may comprise either edge of the door, it is necessary to provide a magnet in each of the vertical portions of the magnetic gasket and, as the nonmagnetic plug may not be used, another solution is required for the rolling of the gasket problem.

The present invention comprehends an improved magnetic gasket door seal structure eliminating the disadvantages of the known magnetic gasket door seal structures in a novel and simple manner.

Thus, a principal feature of the present invention is the provision of a new and improved magnetic gasket door seal structure.

Another feature of the invention is the provision of such a door seal structure having new and improved means for preventing rolling of the magnetic gasket during closing of the door.

A further feature of the invention is the provision of such a magnetic gasket door seal structure having retaining means fixed adjacent the magnetic gasket for preventing flexible rolling thereof.

Still another feature of the invention is the provision of such a magnetic gasket door seal structure wherein the retaining means comprises a rigid member having a portion engaging the outer portion of the magnetic gasket means to continuously brace the magnetic gasket means against roll over.

A yet further feature of the invention is the provision of such a magnetic gasket door seal structure wherein the retaining means further defines with the magnetic gasket structure an insulating space for augmenting the sealing functioning of the magnetic gasket structure.

Yet another feature of the invention is the provision of such a magnetic gasket door seal structure wherein the retaining means defines a wall member for deflecting air currents away from the magnetic gasket for augmenting the sealing functioning of the magnetic gasket.

A further feature of the invention is the provision of such a magnetic gasket door seal structure arranged for facilitated mounting thereof on the door.

A yet further feature of the invention is the provision of such a magnetic gasket door seal structure arranged to be mounted on the door by the means for mounting the magnetic gasket thereon.

Another feature of the invention is the provision of such a magnetic gasket door seal structure having a new and improved retaining means which is extremely simple and economical of construction and which may be readily installed in association with the magnetic gasket.

In summary, the invention comprehends the provision of a new and improved seal structure for use in a wall structure having an opening and a door movably mounted thereon for selective movement to a position wherein the door closes the opening. The seal structure includes a magnetic gasket and means mounted on the door to prevent flexible rolling of the magnetic gasket rearwardly of the door as the door is being moved to the closing position. The retaining means comprises a rigid brace member which further defines with the magnetic gasket structure an insulating space and means for deflecting air currents for further improving the sealing functioning of the gasket.

Other features and advantages of the invention will be apparent from the following description taken in connection with the accompanying drawing wherein:

FIGURE 1 is a top plan view of a refrigeration apparatus having a door seal structure embodying the invention;

FIGURE 2 is a front elevation of the refrigeration apparatus;

FIGURE 3 is a fragmentary enlarged horizontal section taken substantially along the line 3—3 of FIGURE 2, illustrating the door seal structure of the invention;

FIGURE 4 is a front elevation of the gasket bracing means with a portion broken away to illustrate details; and FIGURE 5 is a perspective view of a modified gasket bracing means.

As disclosed in the drawing, a cabinet generally designated 10, herein comprising a refrigerator cabinet, is shown to include an enclosure portion 11 selectively closed by a door 12 mounted on the enclosure portion 11 by hinges 13. As shown in FIGURES 1 and 2, the hinges 13 which may be reversible are installed at the top and bottom of the enclosure 11, and are connected to the door 12 at a hinge-edge portion 14 thereof. The door may be provided with a suitable handle 15 for controlled opening and closing of the door, as desired.

As indicated briefly above, the door 12 is sealed to a metal frame 16 at the front of the enclosure portion 11 by a magnetic gasket, generally designated 17, such as shown and described in the above-identified Bower et al. Patent No. 2,958,912 to which patent reference may be had for a detailed description of the magnetic gasket structure. Briefly, however, magnetic gasket structure 17 includes a mounting portion 18, a cover portion 19, a housing portion 20 enclosing a flexible magnet 21, and a bellows portion 22 which is resiliently flexible and which is biased to urge the housing portion 20 and magnet 21 therein to adjacent the cover portion 19. However, when the door is swung toward the closed position wherein the magnet 21 becomes closely juxtaposed to the metal frame 16, the magnet is attracted to the frame 16 against the resilient action of the bellows portion 22 to arrange the magnetic gasket 17 in the extended disposition of FIGURE 3.

The mounting portion 18 of the magnetic gasket is retained on the door 12 by means of a clamp 23 which is secured to the edge portion 14 of the door by suitable means such as screws 24.

As indicated above, when the door is swung from an open position toward the closed position of FIGURE 3, the magnet 21 will be attracted to the metal frame 16 of the cabinet prior to reaching the final sealing position of FIGURE 3. Illustratively, the magnet may be attacted to a portion 25 of the metal frame 16 as the door is swung to the fully closed position. If the housing portion 20 does not slide freely along the surface of the frame 16 after the magnet is attracted to the portion 25, the flexible bellows will tend to pull the housing portion 20 and magnet 21 therein in a rolling manner away from the frame 16, thereby distorting the gasket and preventing a proper facial engagement seal of the type shown in FIGURE 3. To prevent this undesirable rolling action while yet maintaining the desired degree of flexibility in the magnetic gasket 17, a retaining or bracing member, generally designated 26, is provided by the present invention. As best seen in FIGURES 3 and 4, the retaining member comprises an elongated member having a generally V-shaped transverse section including a first leg 27 and a second leg 28 extending at an angle of approximately 60° to the first leg. The retaining member is preferably formed of a relatively rigid material such as an extruded plastic, and as best seen in FIGURE 4, leg 27 thereof may be provided with a plurality of slots 29. As shown in FIGURE 3, the slots are adapted to receive the screws 24 so that the screws 24 may retain not only the clamp 23 but also the retaining member in fixed association with the door 12. Thus the retaining member 26 may be readily installed at the factory or in the field. If a rolling problem develops after a refrigerator is in use, the retaining member 26 may be readily installed in the field by simply loosening the existing screws 24, inserting the portion 27 of the retaining member to receive the screws 24 in the slots 29, and retightening the screws 24.

The outwardly extending portion 28 of the retaining member is provided at its distal end with a rounded turned lip 30 which is adapted to engage the housing portion 20 of the magnetic gasket structure 17 and maintain the housing portion and magnet 21 therein against rolling as the housing portion 20 slides along the frame 16 to the final closed position of FIGURE 3. Further, the outwardly extending portion 28 of the retaining member comprises a wall member which in cooperation with the magnetic gasket 17 defines an insulating space 31 augmenting the sealing action of the magnetic gasket 17. Still further, the portion 28 of the retaining member defines a deflector wall structure which deflects cold air from the refrigerator away from the magnetic gasket 17 thereby further augmenting the sealing functioning of the magnetic gasket and providing further improved sealing closure of the door to the refrigerator cabinet.

As shown in FIGURE 3, the extension of the retaining member portion 28 away from the door 12 is substantially equal to, or slightly less than, the extension of the magnetic gasket structure away from the door in the extended sealing disposition of the magnetic gasket structure. Thus, the turned lip 30 acts against an outer, or distal, portion of the housing 20 remote from door 12, thereby effectively precluding rolling of the housing portion and thereby maintaining the life and appearance of the magnetic gasket structure and assuring a positive facial sealing engagement between the housing 20 and the frame 16 in the closed arrangement of the door.

The retaining member 26 is extremely simple and economical of construction and may be readily installed in association with the magnetic gasket structure 17. As indicated above, the retaining member may be installed by the manufacturere or, by virtue of the simplified mounting means, may be readily installed in the field when desired.

FIGURE 5 illustrates a modified retaining member generally designated 126, having a first leg 127 and a second leg 128. Leg 127 is provided with an aperture 129 for receiving a screw, such as screw 24 of FIGURE 3, for attaching retaining member 126 to a door. A turned lip 130 is provided on leg 128 of retaining member 126 for the same purpose as lip 30 on retaining member 26. Leg 128 of retaining member 126 is provided with a relieved portion 132 which permits ready access to aperture 129 with a screwdriver or the like for ease in installing the retaining member 126 on a door.

Retaining member 126 is relatively short and is adapted for use where experience shows that only a portion of a magnetic gasket is subject to rolling. Several of the shorter retaining members 126 could of course be used to replace a single retaining member 26.

While we have shown and described two embodiments of our invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. In a wall structure having an opening and a door movably mounted thereon for selective movement to a position wherein said door closes said opening, door seal structure comprising: an elongated flexible magnetic gasket; means mounting said gasket on the door for flexible extension thereof away from the door; and substantially rigid retaining means fixed on the door and having a portion externally adjacent a distal portion of said gasket remote from said door preventing flexible rolling of said gasket laterally of the door toward said retaining means.

2. The door seal structure of claim 1 wherein the door includes a hinged edge and said gasket is mounted on said hinged edge.

3. The door seal structure of claim 1 wherein said gasket mounting means includes means for fixedly mounting said retaining means on the door.

4. The door seal structure of claim 1 wherein said retaining means comprises a wall member defining with said gasket an insulating space for augmenting the sealing functioning of the gasket.

5. The door seal structure of claim 1 wherein said retaining means comprises a wall member defining an air shield for deflecting air currents away from said gasket for augmenting the sealing functioning of the gasket.

6. The door seal structure of claim 1 wherein said retaining means includes means for attachment thereof to said gasket means without removing said gasket means from the door.

7. The door seal structure of claim 1 wherein said gasket mounting means includes a plurality of screws and said retaining means includes a connecting portion having a slotted edge for retention by said screws.

8. The door seal structure of claim 1 wherein said retaining means comprises an elongated wall member having a V-shaped transverse section.

9. The door seal structure of claim 1 wherein said retaining means comprises an elongated wall member having a V-shaped transverse section, said wall member having one edge defining an inturned lip engaging said gasket.

10. The door seal structure of claim 1 wherein said retaining means extends from the door to adjacent the outermost portion of the magnetic gasket in the extended arrangement of the gasket.

11. The door seal structure of claim 1 wherein the door includes a hinged edge and said gasket is mounted on said hinged edge, said retaining means having a length substantially equal to the length of said gasket along said hinged edge of the door.

12. The door seal structure of claim 1 wherein the door includes a hinged edge and said gasket extends along said hinged edge, said retaining means having a length less than the length of said gasket along the hinged edge of the door, and wherein said retaining means defines means for attaching said retaining means to the door and further defines a relieved portion for permitting access to said means for attaching said retaining means to the door.

References Cited

UNITED STATES PATENTS

| | | | |
|---|---|---|---|
| 2,659,118 | 11/1953 | Anderson et al. | 49—478 |
| 2,707,310 | 5/1955 | Goodrich | 49—496 X |
| 2,994,930 | 8/1961 | Cromwell | 49—496 X |
| 3,048,902 | 8/1962 | Hastings et al. | 49—478 X |
| 3,201,833 | 8/1965 | Bryson et al. | 49—478 |

DAVID J. WILLIAMOWSKY, Primary Examiner

PHILIP C. KANNAN, Assistant Examiner

U.S. Cl. X.R.

49—493